Aug. 15, 1950

E. ZOERLEIN 2,519,093

ARMATURE ADJUSTMENT FOR ELECTROMAGNETIC OPERATED SWITCHES

Filed July 26, 1946

EMIL ZOERLEIN.
INVENTOR.

BY E. C. McRae
R. G. Harris
J. R. Faulkner
T. H. Oster
ATTORNEYS.

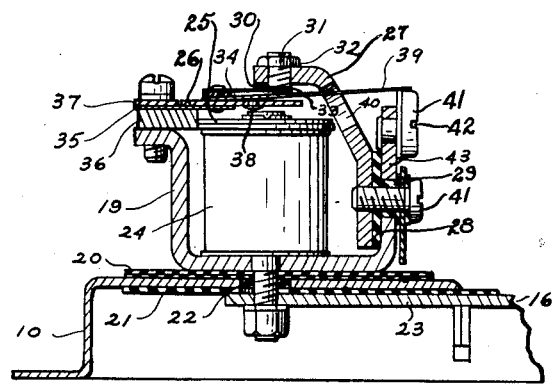

Aug. 15, 1950               E. ZOERLEIN               2,519,093
ARMATURE ADJUSTMENT FOR ELECTROMAGNETIC
OPERATED SWITCHES
Filed July 26, 1946                            3 Sheets-Sheet 3
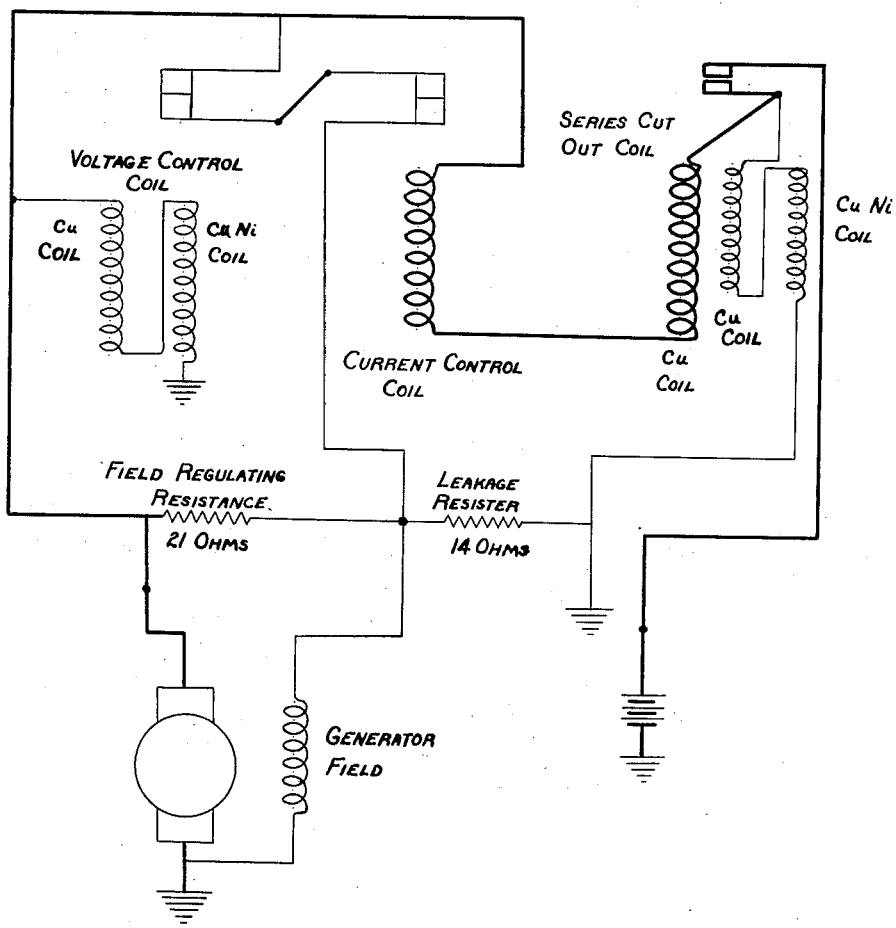
EMIL ZOERLEIN
INVENTOR.
BY
ATTORNEYS Patented Aug. 15, 1950

2,519,093

UNITED STATES PATENT OFFICE 2,519,093

ARMATURE ADJUSTMENT FOR ELECTRO-MAGNETIC OPERATED SWITCHES

Emil Zoerlein, Dearborn, Mich., assignor to Ford Motor Company, Dearborn, Mich., a corporation of Delaware Application July 26, 1946, Serial No. 686,485

4 Claims. (Cl. 200—87)

This application is concerned with a generator control designed especially to regulate the output of an automotive generator, although it is applicable wherever a battery is to be charged from a generator whose speed must vary over wide limits.

Controls for automotive generators should serve at least three distinct purposes. They should closely regulate the voltage of the generator, they should limit the current output of the generator so that it is kept within the capacity of the machine, and they should promptly disconnect the battery from the generator when the generator voltage falls below normal battery voltage to prevent discharge of the battery through the generator. These three functions are each carried out by an individual element in the control assembly. The voltage control unit functions by inserting a resistance in the field circuit of the generator when the voltage becomes too high, the current control similarly limits the output of the generator by inserting a similar resistance in the field circuit when the current output becomes excessive and the battery cutout is simply a relay arranged so as to permit passage of the current in one direction only, that is from the generator to the battery.

To compensate for irregularities inevitable in manufacture and to adjust for wear, each of these individual units must be adjustable. To obtain the best performance of the entire electrical system, each of these adjustments must be accurately made and having once been made, must be retained for long periods of service.

It is an object of this invention to provide a generator control in which the necessary adjustments are readily made. It is a further object of this invention to provide adjustments which are stable in service.

With these and other objects in view, the invention comprises the arrangement, construction and combination of the various elements of the structure described in the specification, claimed in the claims and illustrated in the accompanying drawings, in which:

Figure 3 is an elevation, partially in section, of the voltage control unit, taken on line 3—3 in Figure 2.

Figure 4 is an elevation, partially in section, of the battery cutout, taken on line 4—4 in Figure 2.

Figure 5 is a schematic wiring diagram of the control.

Figure 1:
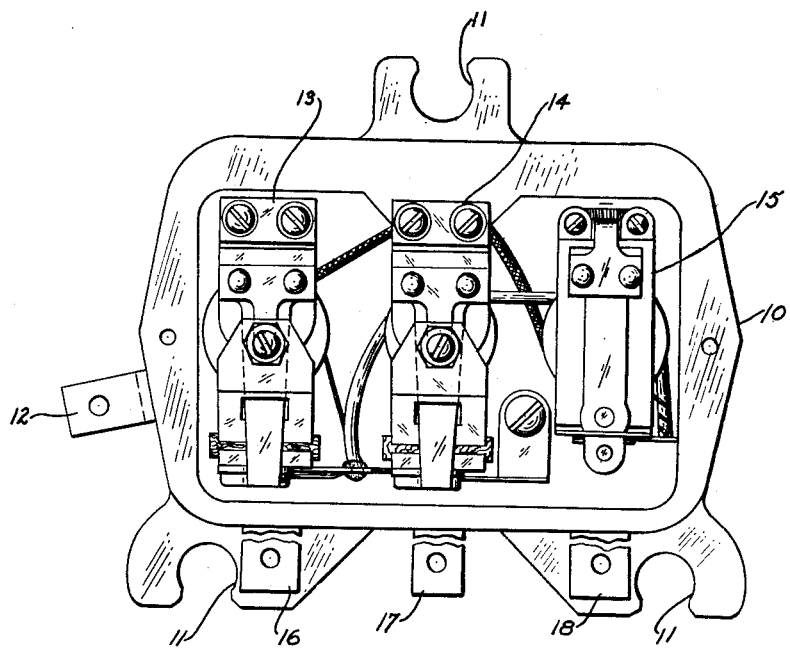
Figure 1 is a plan view of the control with the cover removed.

Figure 1 is a plan elevation of the control. The control is built upon a pressed steel base plate 10 provided with mounting means 11 and ground connection 12. Mounted upon base plate 10 is the voltage control 13, the current control 14 and battery cutout 15. Electrical connecting lugs 16, 17 and 18 are provided respectively for connection to the generator armature, generator field and the battery.

The voltage control unit is shown in section in Figure 3. This control unit is built around a heavy frame 19 which is bolted to base plate 10, but electrically insulated therefrom by insulating plates 20 and 21 and an insulating collar 22. This frame 19 is electrically connected to armature connection 16 by strap 23. Voltage control coil 24 with a central iron core is mounted on frame 19. This is a high resistance coil of many turns of fine wire and is connected to the generator through frame 19 and to ground. To minimize variations in performance due to temperature fluctuations, a portion of voltage control coil 24 is made from a copper nickel alloy commercially known as "Advance." This type of alloy is chosen since the composition can be adjusted to give a temperature coefficient of resistance which approaches zero or is negative. Magnetic shunt 25 extends from the upper end of the iron coil core to a point near the top rear end of frame 19. Magnetic shunt 25 is made of an iron nickel alloy which is characterized by a rapid drop in magnetic permeability at low temperatures. Thus at low temperatures the generator voltage would be controlled at a higher value than at ordinary temperatures. Contact support 27 is bolted to the front of frame 19, but electrically insulated therefrom by insulating plate 28 and insulating collar 29. Contact support 27 supports contact point 30 through screw 31 and lock nut 32. Contact point 30 coacts with contact point 33 which is mounted on armature 26 through cushion spring 34. Armature 26 is secured to frame 19 through spring 35 which is bolted between plates 36 and 37. Brass rivet 38 serves to prevent actual contact between armature 26 and the core of the voltage control core. Armature 26 is biased upwards by spring 39 which passes through aperture 40 in contact support 27 and which rests upon eccentric 41. Eccentric 41 is provided with an adjustment slot 42 designed to receive a screw driver or similar instrument. This eccentric is rotatably mounted in frame 19 and swaged into place in such a manner that a very substantial torque is required for rotation. The fact that the head of eccentric 41 is not concentric with the mounting makes it possible to adjust the tension in spring 39 by rotation of the eccentric. This eccentric is provided with a shoulder 43 so that any burr produced in cutting slot 42 will not interfere with the adjustment.

Current control unit 14 will not be described in detail since it is mechanically identical with voltage control unit 13. It differs therefrom electrically in that its sole winding consists of comparatively few turns of heavy wire inserted directly into the generator battery circuit. It differs from the voltage control magnetically in that the magnetic shunt is not present.

The structure of the battery cutout is shown in detail in Figure 4. Frame 44 is bolted to base plate 10, but electrically insulated therefrom by insulating plates 20 and 21 and insulating collar 45. Frame 44 is connected with battery connection 18 through connector 46. Frame 44 supports an iron core upon which are wound three coils. The outer coil is a continuation of the core of the current control unit and consists of a few turns of coarse wire which is, of course, in series with the generator battery circuit. Under this coarse coil is a coil comprising many turns of fine wire which connects the generator side of the battery cutout 15 to ground. The inner coil resembles the voltage control coil in that it contains, in addition to copper wire, a high resistance copper-nickel alloy section. This coil connects the generator side of the battery cutout and ground. Armature 47 is mounted on frame 44 through spring 48. Armature 47 is biased in an upward direction by spring 49. The tension on spring 49 is adjusted by knurled nut 50. This knurled nut 50 is secured against accidental rotation by spring clip 51. Secured to the forward side of frame 44 is contact support 52 carrying contact 53 and lug 58 (Figure 2) to which is secured the lead to both cutout coils.

Armature 47 carries spring member 54 upon which is mounted contact 55. The face of this contact is spherical to aid in the achievement of good electrical contact despite misalignment of other parts of the instrument. Upward motion of armature 47 and spring member 54 is limited by retainer 56 which is secured to the forward side of the frame 44. The forward end of armature 47 and spring member 54 are held together by rivet 57. This rivet is of non-magnetic material and serves at least two purposes. That portion projecting beneath armature 47 serves to limit the movement in a downward direction of the armature by contact with the frame and also prevents actual contact between the armature and frame. Such contact would tend to cause sticking of the points together. The underside of the head of rivet 57 is flat and parallel with the face of spring member 54. During assembly care is taken to drive rivet 57 so that a clearance of the order of 0.009 inch is left between the underside of the rivet head and the top of spring member 54. As armature 47 is attracted towards the iron core in response to rising generator voltage, contact is first made with spring member 54 tightly resting upon armature 47. As downward motion of the armature continues, spring member 54 flexes through its entire length while the clearance between spring member 54 and rivet 57 is being taken up. When this clearance has been taken up, spring member 54 flexes only forward of rivet 57. The combined action of rivet 57 as a pivot and the pivot spring 48 upon which armature 47 moves results in a slight wiping action of contact 55 over contact 53 which gives a good electrical contact and minimizes any tendency towards welding or sticking.

Figure 2:
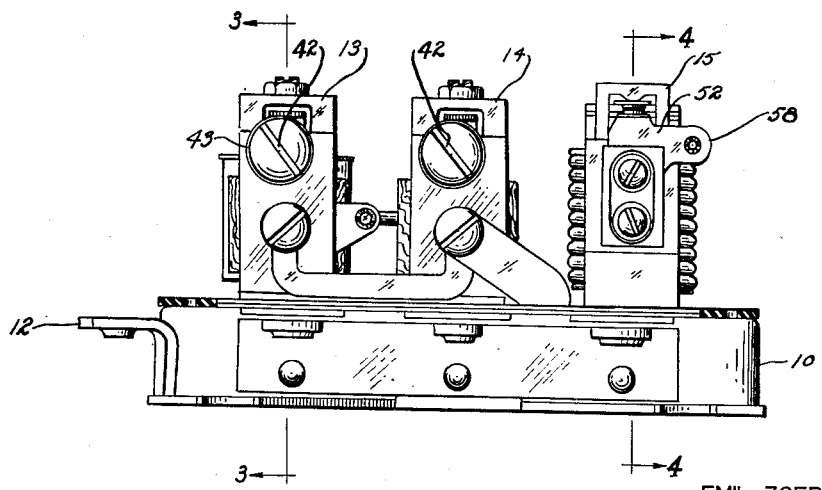
Figure 2 is a front elevation of the control with the cover removed.

Figure 2 is an elevation of the control. It is thought that the significance of this drawing is apparent from the above discussion and that further explanation is not necessary.

Figure 5 is a schematic wiring diagram of the control. In this drawing the path of the generator current to the battery is shown in heavy lines and the ancillary wiring in light lines. The purpose of the leakage resistance is to help take up any voltage surges incident to the interruption of the inductive field circuit by the controls.

I claim as my invention:

1. A voltage control for a vehicle generator comprising a generally U-shaped frame, an eccentric spring adjustment secured to one leg of the U, a temperature compensated shunt coil and axial iron core mounted in the central portion of the U, and an armature assembly mounted on the other leg of the U, the armature assembly comprising an armature, a flat spring hinging the armature to the frame, a contact carrying spring and a spring serving to bias the armature away from the iron core, said biasing spring resting upon the eccentric adjusting means and being adjustable thereby.

2. A current control for a vehicle generator comprising a generally U-shaped frame, an eccentric spring adjustment secured to one leg of the U, a series coil and axial iron core mounted in the central portion of the U and an armature assembly mounted on the other leg of the U, the armature assembly comprising an armature, a flat spring hinging the armature to the frame, a contact carrying spring and a spring serving to bias the armature away from the iron core, said biasing spring resting upon the eccentric adjusting means and being adjustable thereby.

3. The structure in claim 1 in which the adjustment comprises a rotatable pin carrying an eccentrically mounted, shouldered and slotted head, said pin being swaged into frame so that a substantial torque is required for its rotation.

4. The structure in claim 2 in which the adjustment comprises a rotatable pin carrying an eccentrically mounted, shouldered and slotted head, said pin being swaged into frame so that a substantial torque is required for its rotation.

EMIL ZOERLEIN.

REFERENCES CITED

The following references are of record in the file of this patent:

UNITED STATES PATENTS

| Number | Name | Date |
| --- | --- | --- |
| 727,611 | Gilbert et al. | May 12, 1903 |
| 1,398,463 | Lee | Nov. 29, 1921 |
| 1,411,311 | Sullivan | Apr. 4, 1922 |
| 1,576,768 | Loudon | Mar. 16, 1926 |
| 1,591,133 | Kent | July 6, 1926 |
| 1,785,887 | Chryst | Dec. 23, 1930 |
| 2,037,118 | Chubbuck | Apr. 14, 1936 |